(12) United States Patent
Jakel et al.

(10) Patent No.: US 9,921,314 B2
(45) Date of Patent: Mar. 20, 2018

(54) USING CODE MINUS CARRIER MEASUREMENTS TO MITIGATE SPATIAL DECORRELATION ERRORS CAUSED BY IONOSPHERE DELAYS

(71) Applicant: Honeywell International Inc., Morristown, NJ (US)

(72) Inventors: Tom Jakel, Rapid City, SD (US); James Arthur McDonald, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 292 days.

(21) Appl. No.: 14/691,455

(22) Filed: Apr. 20, 2015

(65) Prior Publication Data
US 2016/0306047 A1  Oct. 20, 2016

(51) Int. Cl.
*G01S 19/07* (2010.01)

(52) U.S. Cl.
CPC .................................... *G01S 19/07* (2013.01)

(58) Field of Classification Search
CPC . G01S 19/07; G01S 5/02; G01S 19/27; G01S 19/44; G01S 19/08; G01S 19/20; H04B 7/185; G01C 5/005
See application file for complete search history.

(56) References Cited

U.S. PATENT DOCUMENTS

| 5,828,336 A | 10/1998 | Yunck et al. |
| 6,407,700 B1 | 6/2002 | Giffard |

(Continued)

FOREIGN PATENT DOCUMENTS

EP    2363730    9/2011

OTHER PUBLICATIONS

Sam Pullen & Per Enge An overview of GBAS integrity monitoring with a focus on ionospheric spatial anomalies Indian Journal of Radio & Space Physics vol. 36, Aug. 2007, pp. 249-260.*

(Continued)

*Primary Examiner* — Gregory C. Issing
(74) *Attorney, Agent, or Firm* — Fogg & Powers LLC

(57) ABSTRACT

A Ground-Based Augmentation System (GBAS) includes a plurality of Global Navigation Satellite System (GNSS) reference receivers configured to receive and process GNSS satellite measurements. The GBAS further includes at least one processing module communicatively coupled to the plurality of GNSS reference receivers, configured to: determine a respective ionosphere quality metric along lines of sight for of observable GNSS satellites using code minus carrier measurements from the observable GNSS satellites; define one or more valid ionosphere regions where at least one respective ionosphere quality metric meets a threshold; determine which of the observable GNSS satellites have an ionosphere pierce point within the one or more valid ionosphere regions; and output at least one overbounded Vertical Ionosphere Gradient standard deviation ($\sigma_{vig}$) corresponding to the one or more valid ionosphere regions and an indication of which observable GNSS satellites have an ionosphere pierce point within the one or more valid ionosphere regions.

20 Claims, 4 Drawing Sheets

(56) References Cited

U.S. PATENT DOCUMENTS

| | | | |
|---|---|---|---|
| 6,552,680 B1* | 4/2003 | Barber | G01S 5/009 |
| | | | 342/357.23 |
| 6,781,542 B2 | 8/2004 | Hoven | |
| 7,256,730 B2 | 8/2007 | Hernandez-Pajares et al. | |
| 7,289,061 B2 | 10/2007 | Komjathy et al. | |
| 8,085,196 B2 | 12/2011 | Whitehead | |
| 8,193,979 B2* | 6/2012 | McBurney | G01S 19/03 |
| | | | 342/357.4 |
| 2005/0212696 A1 | 9/2005 | Bartone et al. | |
| 2009/0182502 A1 | 7/2009 | Riter et al. | |
| 2013/0332072 A1 | 12/2013 | Janky et al. | |
| 2014/0062765 A1 | 3/2014 | Brenner | |
| 2014/0163938 A1 | 6/2014 | Sparks et al. | |
| 2014/0285376 A1 | 9/2014 | Scheitlin | |
| 2014/0292573 A1 | 10/2014 | Drescher et al. | |
| 2016/0282470 A1 | 9/2016 | McDonald et al. | |

OTHER PUBLICATIONS

Jiyun Lee Enhancements of Long Term Ionospheric Anomaly Monitoring for the Ground-Based Augmentation System Korea Advanced Institute of Science and Technology and Sam Pullen Stanford University.*

Development of an Ionosphere Monitoring Technique Using GPS Measurements for High Latitude GPS Users (URL: http://www.geomatics.ucalgary.ca/links/GradTheses.html) by Mahmoud Lotfy El Gizawy Mar. 2003.*

Lee et al., "Position-Domain Geometry Screening to Maximize LAAS Availability in the Presence of Ionosphere Anomalies", "ION GNSS 19th International Technical Meeting of the Satellite Division", 2006, pp. 1-16.

Ramakrishnan et al., "Targeted Ephemeris Decorrelation Parameter Inflation for Improved LAAS Availability during Severe Ionosphere Anomalies", "Proceedings ION NTM", 2008, pp. 1-13.

Simili et al., "Code-Carrier Divergence Monitoring for the GPS Local Area Augmentation System", "IEEE/ION Position, Location, and Navigation Symposium 2006", 2006, pp. 483-493.

European Patent Office, "Extended European Search Report from EP Application No. 16161781.6 dated Aug. 25, 2016", "from Foreign Counterpart of U.S. Appl. No. 14/671,825", dated Aug. 25, 2016, pp. 1-10, Published in: EP.

Pi et al., "Observations of Global and Regional Ionospheric Irregularities and Scintillation Using GNSS Tracking Networks", Apr. 23, 2013, pp. 752-761, Publisher: Proceedings of the Institute of Navigations Pacific PNT 2013, Published in: US.

McDonald et al., "Systems and Methods Using Multi Frequency Satellite Measurements to Mitigate Spatial Decorrelation Errors Caused by Ionosphere Delays", "U.S. Appl. No. 14/671,825, filed Mar. 27, 2015", Mar. 27, 2015, pp. 1-26, Published in: US.

European Patent Office, "Extended European Search Report from EP Application No. 16164340.8 dated Jul. 11, 2016", "from Foreign Counterpart of U.S. Appl. No. 14/691,455", dated Jul. 11, 2016, pp. 1-9, Published in: EP.

Circiu et al., "Evaluation of Dual Frequency GMAS Performance using Flight Data", "Proceedings of the Ion ITM, 2014", pp. 1-12.

Konno, "Dual-Frequency Smoothing for CAT III LAAS: Performance Assessment Considering Ionosphere Anomalies", "Proceedings of the 20th International Technical Meeting of the Satellite Division of the Institute of Navigation (ION GNSS 2007)", 2007, pp. 1-14.

Lee et al., "Enhancements of Long Term Ionospheric Anomaly Monitoring for the Ground-Based Augmentation System", "Proceedings of the 2011 International Technical Meeting of the Institute of Navigation", Jan. 26, 2011, pp. 930-941.

Lee et al., "Assessment of Nominal Ionosphere Spatial Decorrelation for LAAS", "Proceedings of IEEE/ION Plans 2006", Apr. 27, 2006, pp. 506-514.

Majithiya et al., "Indian Regional Navigation Satellite System", "InsideGNSS, Jan./Feb. 2011", pp. 40-46.

Murphy et al., "More Ionoshphere Anomaly Mitigation Considerations for Category II/III GBAS", "GNSS 2007—Proceedings of the 20th International Technical Meeting of the Satellite Division of the Institute of Navigation", Sep. 28, 2007, pp. 438-452, Publisher: The Institute of Navigation, Published in: US.

Sunehra, "Real-Time Estimation of Ionospheric Delay Using Dual Frequency GPS Observations", "European Scientific Journal", May 2013, pp. 36-50, vol. 9, No. 15.

Sakai et al., "Air Navigation with Global Navigation Satellite Systems and the Ionospheric Effects", "Journal of the National Institute of Information and Communications Technology", Sep. 2009, pp. 231-242, vol. 56, No. 1-4.

Zhao et al., "Detecting Ionospheric Threat for GBAS Based on Spatial-temporal Method", "Proceedings of the 26th International Technical Meeting of the ION Satellite Division", Sep. 20, 2013, pp. 1428-1434, Publisher: ION GNSS+.

United States Patent and Trademark Office, "Office Action", "From U.S. Appl. No. 14/671,825", dated Sep. 6, 2017, pp. 1-29, Published in: US.

Srinivas et al., "Investigation of the Effect of Ionospheric Gradients on GPS Signals in the Context of LAAS", "Progress in Electromagnetics Research B", 2014, vol. 57, pp. 191-205.

* cited by examiner

USING CODE MINUS CARRIER MEASUREMENTS TO MITIGATE SPATIAL DECORRELATION ERRORS CAUSED BY IONOSPHERE DELAYS

BACKGROUND

A Ground Based Augmentation System (GBAS) is used to assist aircraft during approach and landing operations. The ground station of a GBAS broadcasts pseudorange corrections and integrity information to aircraft, which helps to remove Global Navigation Satellite System (GNSS) errors impacting satellite measurements that are processed by the aircraft GNSS receivers. By using GBAS, aircraft have improved continuity, availability, and integrity performance for precision approaches, departure procedures, and terminal area operations.

A major source of error for an aircraft GNSS receiver is caused by the ionosphere, which delays GNSS signals that pass through it. The error due to ionosphere delay can almost be completely mitigated by a GBAS under nominal conditions when the ionosphere is uniform between the GBAS ground station and the aircraft GNSS receiver because the ionosphere delay for signals received by the GBAS ground station and the GNSS receiver will be similar. However, when ionosphere disturbances (e.g., ionosphere storms or other anomalous ionosphere activity) produce a non-uniform ionosphere (referred to as an ionosphere gradient), the ionosphere delay for the signals received by the GBAS ground station and the aircraft GNSS receiver can be different. This difference in ionosphere delay can cause the pseudorange corrections broadcast by the GBAS ground station and applied by the aircraft to be less accurate. When there are large distances between the GBAS ground station and the aircraft, it is possible for the variation in ionosphere delay to result in unacceptably large position errors in the aircraft navigation position solution. Mitigation of large ionosphere gradients can be accomplished via (1) cooperative mitigation between the aircraft and GBAS ground station; or (2) conservative screening based on worst case GNSS satellite geometries combined with assuming the worst case ionosphere gradient. Option 1 requires costly equipment for both the ground and airborne systems, while option 2 results in degraded system continuity and availability.

A real-time screen of all possible GNSS satellite geometries is performed, which removes measurements that may lead to unacceptable position errors in the presence of the worst case ionosphere gradient. More specifically, a GBAS could automatically assume that the worst case ionosphere gradient is always present. When a GBAS ground station checks the possible geometry configurations that an aircraft may be using, any GNSS satellite geometries that produce an error larger than a tolerable error limit, assuming the worst case ionosphere gradient is present, are broadcast to the aircraft with the indication that they should not be used.

The set of available geometries may also be restricted by inflating integrity-related parameters (e.g., broadcast sigmas) such that only usable geometries are available to the aircraft. In exemplary embodiments, this includes: (1) identifying all credible satellite geometries; (2) computing a Maximum Ionosphere Error in Vertical Position (MIEV); (3) computing the smallest possible Vertical Protection Limit (VPL) for this potentially hazardous subset of credible geometries; (4) when any geometries in this subset have a VPL less than the Vertical Alert Limit (VAL) for the desired category of precision approach, begin a search to find the smallest inflation factors that include the VPL above the VAL for all geometries in the subset of credible geometries.

One such integrity related parameter is the Vertical Ionosphere Gradient (VIG) standard deviation, referred to herein as sigma-vig ($\sigma_{vig}$). Typically, $\sigma_{vig}$ is calculated for a future time based on the GNSS satellites that will be in view of the GBAS at a future time. Since GNSS satellites orbit the earth twice each sidereal day, over time, different GNSS satellites rise and set from the perspective of the GBAS. For every cycle, the calculation of $\sigma_{vig}$ is performed for a subsequent epoch for all predicted GNSS satellites that will be in view of the GBAS at the future time on all predicted sub-geometries. The larger of the values between the $\sigma_{vig}$ calculated for one time step in the future and the $\sigma_{vig}$ value previously computed for the current time step is broadcast to the aircraft.

SUMMARY

The embodiments of the present disclosure provide methods and systems for using code minus carrier measurements to mitigate spatial decorrelation errors caused by ionosphere delays.

A Ground Based Augmentation System (GBAS) includes a plurality of Global Navigation Satellite System (GNSS) reference receivers configured to receive and process GNSS satellite signals. The GBAS further includes at least one processing module communicatively coupled to the plurality of GNSS reference receivers, wherein the at least one processing module is configured to determine a respective ionosphere quality metric along a line of sight of at least one GNSS satellite of a plurality of observable GNSS satellites using code minus carrier measurements from the at least one GNSS satellite. The at least one processing module is further configured to set at least one overbounded Vertical Ionosphere Gradient standard deviation ($\sigma_{vig}$) for the at least one GNSS satellite if the respective ionosphere quality metric meets a threshold. The at least one processing module is further configured to define one or more valid ionosphere regions where the at least one overbounded $\sigma_{vig}$ is applicable. The at least one processing module is further configured to determine which GNSS satellites of the plurality of observable GNSS satellites have an ionosphere pierce point within the one or more valid ionosphere regions where the at least one overbounded $\sigma_{vig}$ is applicable. The at least one processing module is further configured to output the at least one overbounded $\sigma_{vig}$ and an indication of which GNSS satellites have an ionosphere pierce point within the one or more valid ionosphere regions.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
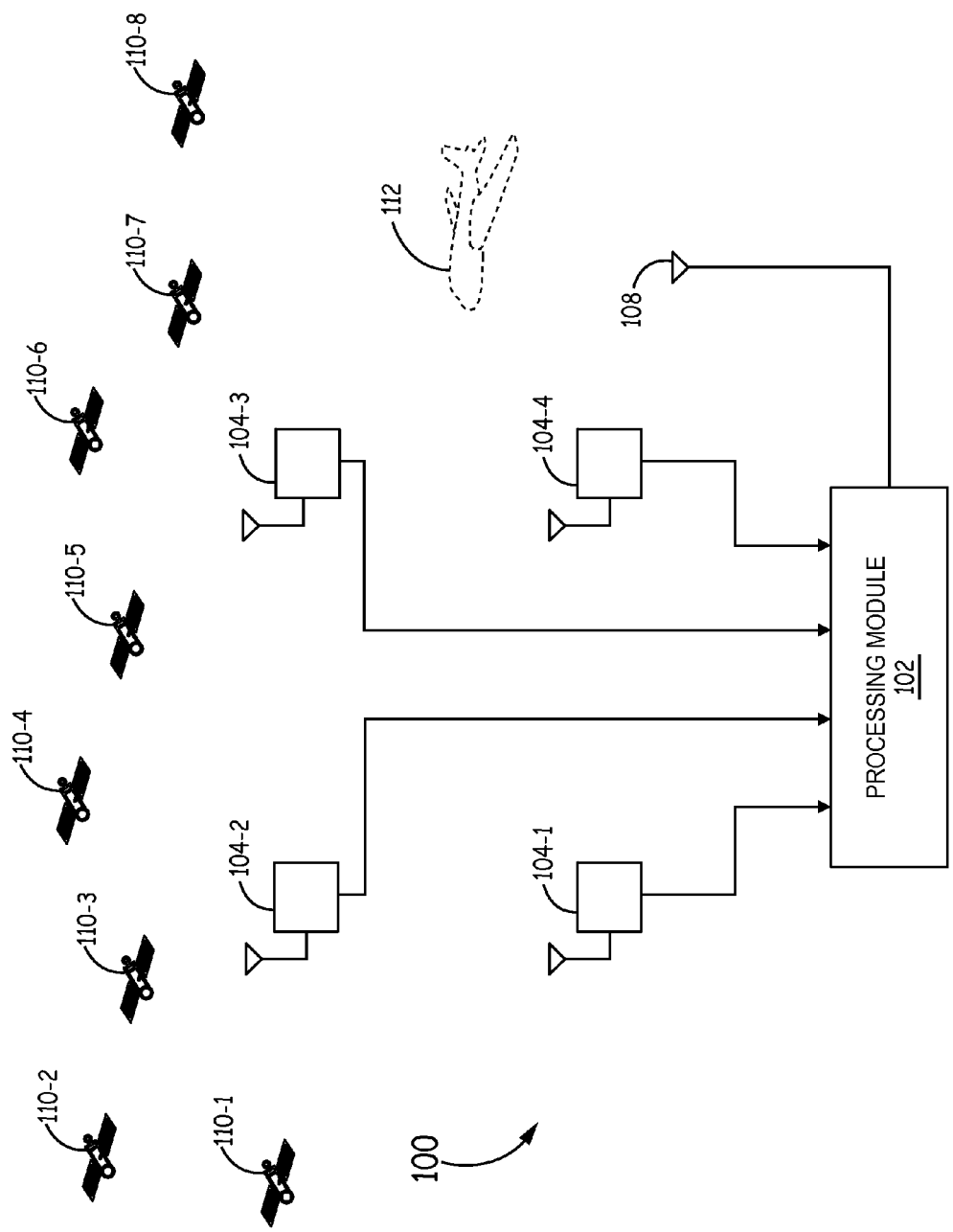
FIG. 1A is an example ground-based augmentation system (GBAS) according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed.

By using the geometric screening and inflation techniques discussed above to mitigate the spatial decorrelation errors caused by the large ionosphere gradients, GBAS continuity and availability performance is significantly degraded. Further, since the worst case ionosphere gradients in the United States have historically been present only about once every ten years, making the worst case assumption often results in the unnecessary underutilization of resources.

The embodiments described below address the above issues associated with ionosphere gradients by implementing a Ground-Based Augmentation System (GBAS) that uses code minus carrier measurements from observable GNSS satellites to define regions of the sky where the ionosphere is healthy. The regions are deemed to be valid ionosphere regions for a finite period of time. For GNSS satellites having ionosphere pierce points within the valid ionosphere regions, a simple overbound mitigation technique can be applied to the satellite measurements instead of the techniques discussed above. Differential corrections based on measurements from any observable GNSS satellites having ionosphere pierce points within the valid ionosphere regions during the finite period of time can be integrity-protected using the overbound technique and used by a vehicle utilizing the GBAS.

FIG. 1A is an example Ground-Based Augmentation System (GBAS) ground station 100 according to one embodiment of the present disclosure. As shown in FIG. 1, the GBAS ground station 100 includes a processing module 102, a plurality of reference receivers 104, and a broadcast module 108.

The reference receivers 104 are ground reference receivers with precisely known positions. Each reference receiver 104 is a radio frequency receiver with an antenna. In the embodiment shown in FIG. 1A, GBAS ground station 100 includes four reference receivers. In other embodiments, a greater or fewer number of reference receivers are used. The reference receivers 104 are communicatively coupled to the processing module 102 through a wired or wireless link.

The reference receivers 104 are each configured to receive and process GNSS signals from a plurality of observable GNSS satellites 110. In exemplary embodiments, the GNSS satellites 100 are single-frequency or multi-frequency GNSS satellites. The GNSS signals transmitted by the GNSS satellites 110 include, but are not limited to, information such as the signal's time of transmission and the position of the GNSS satellite at the time of transmission. This information is also referred to herein as GNSS data.

Each reference receiver 104 calculates its own position using the transmission time of the GNSS signals for GNSS satellites 110 from which it receives GNSS signals. The transmission time is the difference between the time the GNSS signals were transmitted from the respective GNSS satellite 110 and the time the reference receiver 104 received the GNSS signals. Each reference receiver 104 sends its calculated position to the processing module 102 to be used for the differential corrections.

The reference receivers 104 are also configured to receive and process code and carrier measurements from the plurality of observable GNSS satellites 110. The reference receivers 104 calculate the difference between the two measurements to obtain the code minus carrier measurement, which is essentially a measure of the rate of change of ionosphere delay. The reference receivers 104 send the code minus carrier measurements of the plurality of observable GNSS satellites 110 to the processing module 102.

Figure 1B:
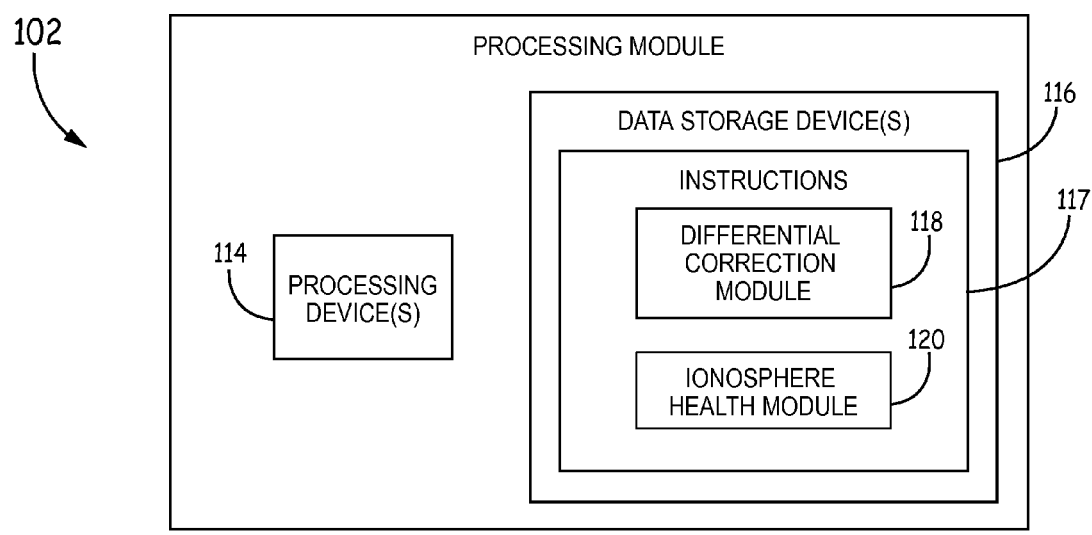
FIG. 1B is an example GBAS processing module according to one embodiment of the present disclosure.

As shown in FIG. 1B, the processing module includes one or more processing devices 114. The one or more processing devices 114 can include any suitable processing device such as a digital signal processor (DSP), central processing unit (CPU), micro-controller, arithmetic logic unit (ALU), Field Programmable Gate Array (FPGA), or others known to those having skill in the art.

The one or more processing devices 114 may include or function with software programs, firmware, or other computer readable instructions, such as instructions 117, for carrying out various methods, process tasks, calculations, and control functions, used in the functionality described herein. In exemplary embodiments, the instructions 117 can include a differential correction module 118 and an ionosphere health module 120 to implement the functionality described herein. In exemplary embodiments, the differential correction module 118 and the ionosphere health module 120 can be the same module.

These instructions 117 are stored on one or more data storage devices 116. In exemplary embodiments, the one or more data storage devices 116 can include any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The differential correction module 118 is configured to receive the position calculations from the reference receivers 104. The differential correction module 118 uses the position calculations, as well as the precisely known positions of the reference receivers 104, to determine an estimation of the error in the GNSS based calculations. In exemplary embodiments, these errors in the GNSS based calculations are used to provide differential corrections to GNSS receivers on aircraft 112 using the broadcast module 108. In other embodiments, differential corrections may also be provided to other vehicles, objects, things, or people.

Residual errors remain after application of differential correction terms. The GBAS ground station also broadcasts integrity-related parameters with the differential corrections, such as $\sigma_{vig}$, that enable the position error of the aircraft 112 to be statistically bound. In exemplary embodiments, the position is bound by a cylindrical shaped boundary, referred to as a protection limit, around the aircraft 112 having a vertical component and a lateral component. In other embodiments, boundaries having other shapes are used. In exemplary embodiments, the vertical component is bound to less than 10 meters such that the aircraft is actually within 10 meters of where it thinks it is with a high probability (such as $1-10^{-7}$).

The ionosphere health module 120 uses the code minus carrier measurements from the reference receivers 104 to determine the quality of the ionosphere. In exemplary embodiments, the ionosphere health module 120 determines a respective ionosphere quality metric along a line of sight of a first GNSS satellite of a plurality of observable GNSS satellites 110 using the code minus carrier measurements provided by the reference receivers 104. In exemplary embodiments, determining the respective ionosphere quality metric along a line of sight of the first GNSS satellite 110 includes determining the rate of change of a total electron count along the respective line of sight of the first GNSS satellites 110. The ionosphere health module 120 then uses the rate of change of the total electron count to determine a respective ionosphere quality metric for the line of sight. In exemplary embodiments, the ionosphere quality metric relates inversely to the rate of change of the total electron count. In exemplary embodiments, the ionosphere quality metric can be defined using a numerical range that corresponds to a scale from a healthy ionosphere to an ionosphere storm.

If the ionosphere quality metric along the line of sight of the first GNSS satellite meets a threshold, then the first GNSS satellite is considered safe for mitigation using an overbounded $\sigma_{vig}$. That is, the complex geometric screening and $\sigma_{vig}$ inflation techniques used by the GBAS processing module 102 can be suspended for the first GNSS satellite and a simpler technique of overbounding the $\sigma_{vig}$ can be used. In exemplary embodiments, overbounding of $\sigma_{vig}$ can be accomplished by increasing the error bounding distance from the aircraft 112 by adding a K factor and/or sigma multiplier. For example, a one meter one-sigma error indicates that 67% of the time the aircraft 112 is within one meter and this is Gaussian distributed. The one-sigma can be statistically overbound to 95% by multiplying it by two and broadcasting to a user that there is a two meter $\sigma_{vig}$ overbound on this ranging source. This assures that 95% of the time, the range error is not going to exceed 2 meters during fault free conditions.

In exemplary embodiments, the processing module 102 can switch between the overbounding technique and the more complicated screening techniques based on the circumstances. In exemplary embodiments, greater or fewer GNSS satellites 110 can be used depending on which technique is used. In exemplary embodiments, the processing module 102 can switch between the overbounding technique and the screening techniques and switch the number of GNSS satellites 110 used seamlessly.

When the technique of overbounding the $\sigma_{vig}$ can be used, the ionosphere health module 120 sets an overbounded $\sigma_{vig}$ for the respective line of sight and a region of the sky surrounding the ionosphere pierce point for the first GNSS satellite. The point at which a satellite's line of sight from a respective reference receiver intersects a two-dimensional shell defined for the ionosphere is the pierce point for the particular satellite. The region of the sky surrounding the ionosphere pierce point where the ionosphere quality metric meets a threshold is defined as a valid ionosphere region for a finite period of time. In exemplary embodiments, the area of the valid ionosphere region varies depending on the quality of the ionosphere at the pierce point. For example, if the ionosphere is determined to be healthy, then the valid ionosphere region may extend 50 nautical miles from the pierce point. However, if the ionosphere is less than healthy, the area of the valid ionosphere region will be proportionately less depending on the severity of the degraded quality of the ionosphere.

In exemplary embodiments, this process is repeated for one or more additional observable GNSS satellites 110 where the respective ionosphere quality metric meets the threshold. In exemplary embodiments, the one or more additional observable GNSS satellites 110 is less than half of the total amount of observable GNSS satellites 110. In some embodiments, the same overbounded $\sigma_{vig}$ set for the first GNSS satellite is applicable to the valid ionosphere regions for each of the GNSS satellites 110 that has a respective ionosphere quality metric meet the threshold. In other embodiments, two or more different overbounded $\sigma_{vig}$ values are applicable to subsets of the valid ionosphere regions.

Figure 2:
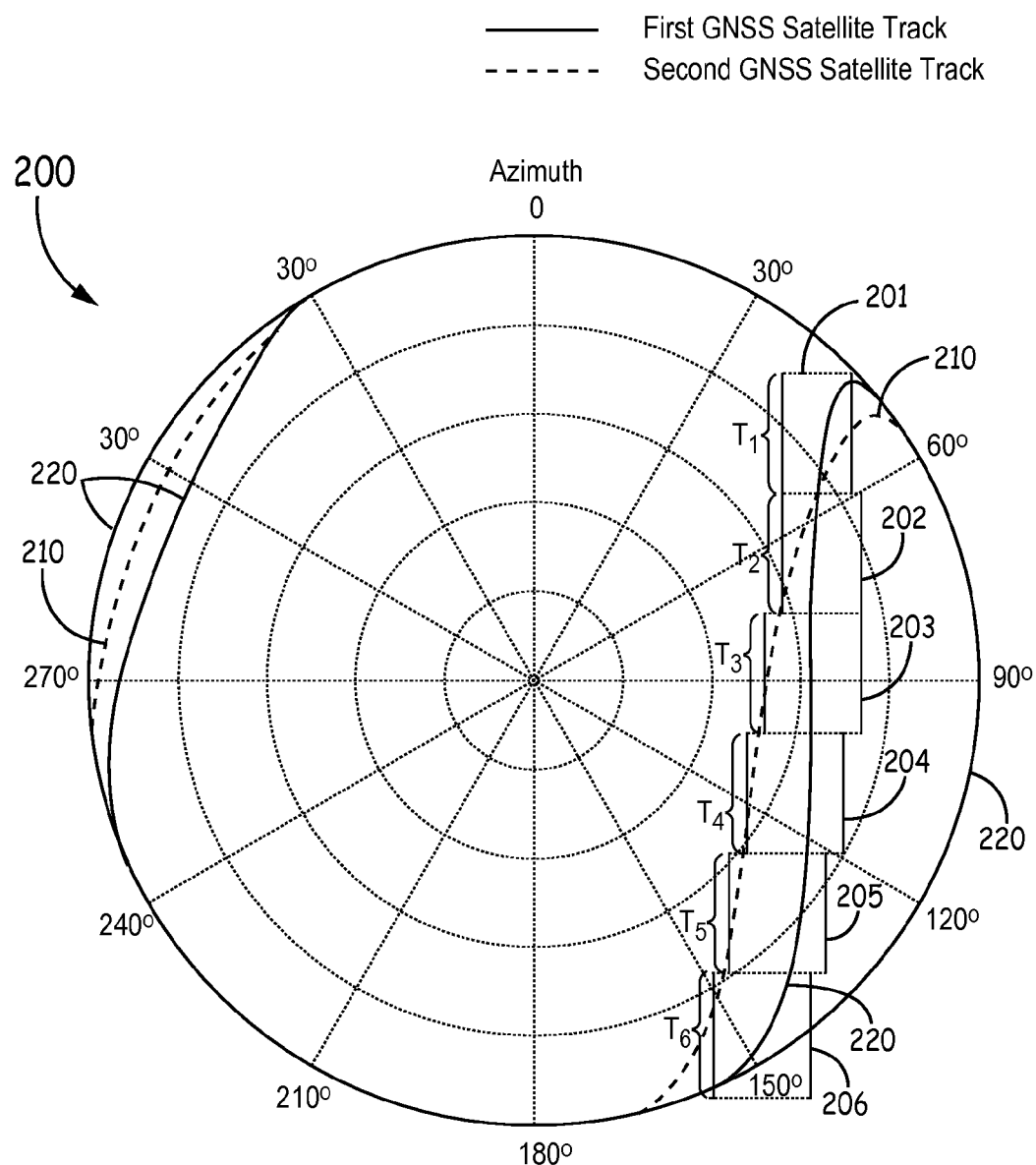
FIG. 2 is a chart of the sky illustrating example valid ionosphere regions defined using code minus carrier measurements from GNSS satellites according to one embodiment of the present disclosure.

FIG. 2 is chart of the sky illustrating example valid ionosphere regions for a first GNSS satellite track seen from the perspective of a GBAS ground station, such as GBAS ground station 100. In the example shown in FIG. 2, a first GNSS satellite travels along track 220. The GBAS ground station observes this GNSS satellite and the processing module determines whether the ionosphere surrounding track 220 is healthy using code minus carrier measurements from the GNSS satellite as discussed above. If the ionosphere quality metric meets a threshold at time interval $T_1$, then ionosphere region 201 is defined as valid ionosphere region for the finite period of time $T_1$. The first GNSS satellite, traveling along its orbital path, will subsequently move along track 220. The processing module checks if the ionosphere is healthy at each time interval along track 220. In FIG. 2, the processing module determines that the ionosphere is healthy at each time interval ($T_1$-$T_6$); therefore, regions 201-206 are defined as valid ionosphere regions for the respective time intervals. In exemplary embodiments, the time intervals are approximately 20 minutes in length. In other embodiments, the time intervals can have shorter or greater length depending on the conditions of the ionosphere. In exemplary embodiments, the region is only considered valid for the finite period in time in which the first GNSS satellite has a pierce point falling within that ionosphere region.

In addition to defining the valid ionosphere regions as discussed above, the code minus carrier measurements for each of the plurality of GNSS satellites 110 can also be used by the ionosphere health module 120 to define further valid ionosphere regions. In exemplary embodiments, the ionosphere health module 120 analyzes the ionosphere quality metric for pierce points of the GNSS satellites 110 to determine if an ionosphere gradient may be present between them. In one embodiment, the ionosphere health module 120 compares the ionosphere quality metrics of pierce points of GNSS satellites 110 that are within a threshold distance of one another. In exemplary embodiments, the threshold distance can be a straight-line distance or a radial distance. In exemplary embodiments, the threshold distance is approximately 100 km. In other embodiments, the threshold distance can be shorter or longer depending on the condition of the ionosphere. If the difference between the ionosphere quality metrics at pierce points for GNSS satellites 110 within the threshold distance to one another is below a threshold, then the ionosphere health module 120 may assume that an ionosphere gradient is not present in the regions of the sky between the pierce points. Thus, these regions between the pierce points are also defined as valid ionosphere regions. This process can be repeated for all GNSS satellites 110 having an ionosphere quality metric that meets the threshold. In exemplary embodiments, the valid ionosphere regions are rectangular (as shown in FIG. 2). In other embodiments, the valid ionosphere regions are circular or any other geometric shape.

It is likely that not all of the observable GNSS satellites 110 will be used to define the valid ionosphere regions. Therefore, after the valid ionosphere regions are defined, the ionosphere health module 120 can further analyze which additional GNSS satellites 110 have ionosphere pierce points that fall within the valid ionosphere regions. Any GNSS satellite 110 having an ionosphere pierce point within a valid ionosphere region will be considered safe for mitigation via an overbounded $\sigma_{vig}$. That is, the complex geometric screening and $\sigma_{vig}$ inflation techniques used by the GBAS processing module 102 can be suspended for these GNSS satellites 110 and the simpler technique of overbounding the $\sigma_{vig}$ can be used. By conducting this analysis, the ionosphere health module 120 can leverage the valid ionosphere regions and determine which differential corrections from additional GNSS satellite measurements can also be broadcast to the aircraft 112. If a GNSS satellite 110 does not have a pierce point within a valid ionosphere region, then the measurements from that GNSS satellite 110 will be considered unsafe for mitigation via an overbounded $\sigma_{vig}$. In exemplary embodiments, each of the plurality of observable GNSS satellites 110 are evaluated to determine if their respective ionosphere pierce point is within a valid ionosphere region.

FIG. 2 shows this process with a second GNSS satellite as viewed by the GBAS ground station 100 along track 210. The GBAS ground station 100 may broadcast differential corrections for the second GNSS satellite signals during the given finite period in which the pierce point of the second GNSS satellite falls within a valid ionosphere region. That is, when the pierce point of the second GNSS satellite exists within an ionosphere region currently co-occupied by the first GNSS satellite, and the ionosphere health module 120 has determined the ionosphere region to be a valid ionosphere region based on the quality metric for the first GNSS satellite, then processing module 102 may leverage that determination when broadcasting differential corrections associated with the second GNSS satellite. For example, the signals for the second GNSS satellite shown in FIG. 2, are most reliable at time intervals T1 and T2 (within the valid ionosphere regions 201 and 202) when the second GNSS satellite has a pierce point nearest to the pierce point of the first GNSS satellite's track 210. By time interval T6, track 210 of the pierce point of the second GNSS satellite has significantly traveled away from the first GNSS satellite track 220 so that the pierce point of the second GNSS satellite is no longer in the valid ionosphere region.

In exemplary embodiments, after determining which of the plurality of observable GNSS satellites 110 have ionosphere pierce points within the valid ionosphere regions, the processing module 102 can then determine if the number of GNSS satellites 110 considered safe for mitigation via an overbounded $\sigma_{vig}$ will be able to produce a Vertical Protection Limit (VPL) that would meet the Vertical Alert Limit (VAL) required for the desired precision approach. In exemplary embodiments, the VAL for a Category I approach is 10 meters. In exemplary embodiments, if the computed VPL is less than the VAL, then the GBAS ground station 100 broadcasts the overbounded $\sigma_{vig}$ as well as an indication of the GNSS satellites 110 having ionosphere pierce points within the valid ionosphere regions. In exemplary embodiments, the GBAS ground station 100 broadcasts an indication of the GNSS satellites 110 having ionosphere pierce points within the valid ionosphere regions and those that do not regardless of the VPL determination. In such embodiments, the GNSS satellites 110 having ionosphere pierce points within the valid ionosphere regions will be marked as safe for use and GNSS satellites 110 having ionosphere pierce points outside the valid ionosphere regions will be marked as unsafe for use.

In exemplary embodiments, if the processing module 102 determines that there is currently an ionosphere storm (or other ionosphere interference) at a certain level, the processing module 102 applies a hysteresis by waiting a certain timeout period (such as a number of minutes and/or hours) before resuming operation of the ionosphere health module 120. In exemplary embodiments, the timeout period is determined by looking at data from a number of stations over a number of days to determine how increasing and/or decreasing this timeout period affects the gradient distribution. In exemplary embodiments, a sensitivity analysis is performed to the timeout period to select a timeout period where the gradient distribution collapsed to be similar to what the gradient distribution was under a quiet day without these ionosphere storms present. Accordingly, in exemplary embodiments the timeout period is selected to be a duration when the distribution of ionosphere gradients for a particular geographic area has historically collapsed to what would be expected on a normal day with a particular decreased ionosphere quality metric. In exemplary embodiments, the processing module 102 determines that the system is not able to function adequately once a certain threshold of ionosphere gradients is met and the hysteresis using the timeout period allows the GBAS ground station 100 to reach a more normal state before it is considered to be functioning adequately enough to provide valid data.

The GBAS ground station discussed above provides many advantages over conventional GBAS ground stations. By mapping regions of the sky where the ionosphere is healthy, GBAS ground station is able to leverage GNSS satellite measurements to avoid having to use the computationally intensive geometric screening and inflation processes. Also, the GBAS will have greater continuity and availability because assuming the worst case ionosphere gradient is not necessary in circumstances where the overbounded $\sigma_{vig}$ mitigation is possible.

Further, the GBAS ground station does not require a modification to the reference receivers as with other proposed solutions. Specifically, the reference receivers do not need to be configured to receive and process multi-frequency satellite signals or Space Based Augmentation System (SBAS) satellite signals. Also, the embodiments of the present disclosure can utilize signals from all GNSS satellites when defining the valid ionosphere regions, rather than being limited to using just multi-frequency satellites or just SBAS satellites. Thus, the embodiments of the present disclosure address the problem with ionosphere gradients in a manner that is cheaper than other proposed solutions and provide greater continuity and availability as well.

In exemplary embodiments, the GBAS ground station 100 can be further modified to utilize the code minus carrier measurements from observable GNSS satellites 110 of multiple GNSS constellations when defining the valid ionosphere regions, not just the constellation for which the GBAS is broadcasting corrections. This modification of the GBAS ground station 100 requires that the reference receivers 104 be configured to receive GNSS data from multiple GNSS constellations. In exemplary embodiments, the GNSS constellations may include the United States' Global Positioning System (GPS), Russia's Global'naya Navigatsionnaya Sputnikovaya Sisterna (GLONASS), China's Beidou and Compass, and the European Union's Galileo. In exemplary embodiments, the GBAS ground station 100 will only broadcast differential corrections for GNSS satellites 110 from a single GNSS constellation. For example, when configured for GPS, the processing module 102 may utilize the code minus carrier measurements from GNSS satellites from the GPS, GLONASS, and Galileo constellations when defining the valid ionosphere regions, but would only broadcast differential corrections for GPS satellites. By using the code minus carrier measurements from GNSS satellites 110 of multiple GNSS constellations, a greater area of the sky may be defined using the above techniques. This increases the likelihood that the GBAS ground station 100 can utilize the less complex overbounded $\sigma_{vig}$ mitigation technique.

Figure 3:
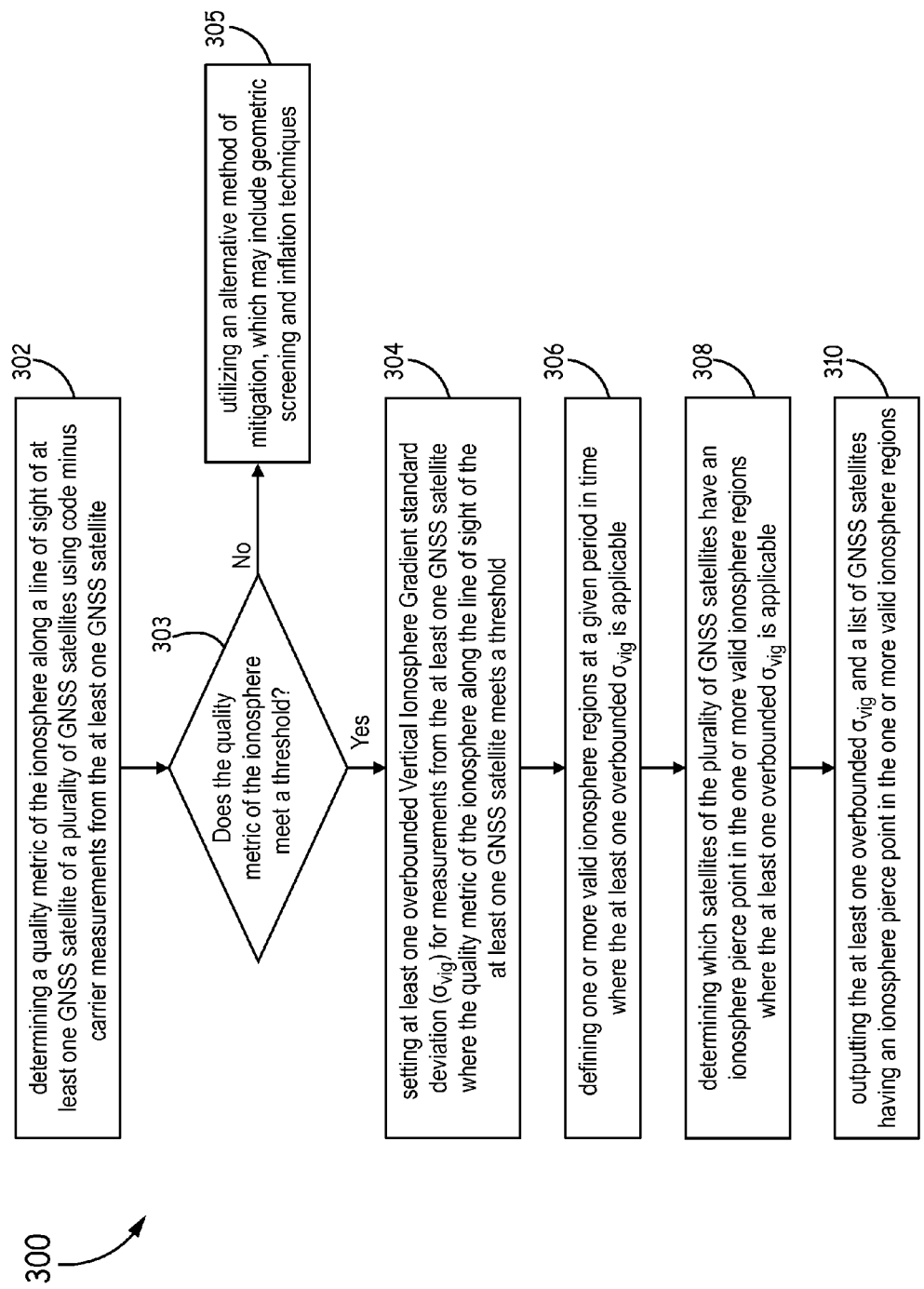
FIG. 3 is a flow diagram illustrating one example method of selecting a GBAS ionosphere threat mitigation technique using GNSS satellites according to one embodiment of the present disclosure.

FIG. 3 is a flow chart illustrating an example method 300 of one embodiment of the present disclosure. In one implementation, one or more elements of method 300 are implemented within a GBAS ground station, such as GBAS ground station 100 discussed above with respect to any of FIGS. 1A-1B and FIG. 2. Method 300 is implemented using GNSS satellite measurements to mitigate spatial decorrelation errors caused by ionosphere gradients. For some embodiments, the method of FIG. 3 may be implemented using any embodiment of a GBAS ground station or elements thereof described above.

The method starts at block 302 with determining a quality metric of the ionosphere along a line of sight of at least one GNSS satellite of a plurality of GNSS satellites using code minus carrier measurements from the at least one GNSS satellite. In some embodiments, determining the quality metric of the ionosphere includes computing a rate of change of the total electron count along the line of sight of the at least one GNSS satellite.

The method proceeds to block 303 with checking if the quality metric of the ionosphere meets a threshold. When the quality metric of the ionosphere does not meet the threshold, the method proceeds to block 305 with utilizing an alternative method of mitigation, which in some embodiments, may include geometric screening and inflation techniques used by the GBAS ground station to assist the aircraft to compensate for the ionosphere delay. In exemplary embodiments, the quality metric of the ionosphere can be severe enough that the measurements of the GNSS satellites have to be excluded from broadcast.

When the quality metric of the ionosphere meets the threshold, the method proceeds to block 304 with setting at least one overbounded Vertical Ionosphere Gradient (VIG) standard deviation ($\sigma_{vig}$) for measurements from at least one GNSS satellite. In exemplary embodiments, the overbound can be set by increasing the error bounding distance from the aircraft by adding a K factor and/or a sigma multiplier.

The method proceeds to block 306 with defining one or more valid ionosphere regions at a given period in time where the at least one overbounded $\sigma_{vig}$ is applicable. In some implementations of this method, valid ionosphere regions may be defined by utilizing GNSS satellites from multiple constellations.

The method proceeds to block 308 with determining which satellites of the plurality of GNSS satellites have an ionosphere pierce point in the one or more valid ionosphere regions where the at least one overbounded $\sigma_{vig}$ is applicable. In some implementations, method 300 further comprises computing differential corrections using measurements from GNSS satellites that have an ionosphere pierce point in the one or more valid ionosphere regions.

The method proceeds to block 310 with outputting the at least one overbounded $\sigma_{vig}$ and a list of GNSS satellites having an ionosphere pierce point in the one or more valid ionosphere regions. In an implementation of this method, outputting the at least one overbounded $\sigma_{vig}$ and a list of GNSS satellites having an ionosphere pierce point in the one or more valid ionosphere regions includes broadcasting this information to a vehicle (e.g., an aircraft). In exemplary embodiments, outputting the at least one overbounded $\sigma_{vig}$ and a list of GNSS satellites having an ionosphere pierce point in the one or more valid ionosphere regions occurs if the number of GNSS satellites considered safe for mitigation via an overbounded $\sigma_{vig}$ will be able to produce a Vertical Protection Limit (VPL) that would meet the Vertical Alert Limit (VAL) required for the desired precision approach.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a Ground Based Augmentation System (GBAS), comprising: a plurality of Global Navigation Satellite System (GNSS) reference receivers configured to receive and process GNSS satellite signals; at least one processing module communicatively coupled to the plurality of GNSS reference receivers, wherein the at least one processing module is configured to: determine a respective ionosphere quality metric along a line of sight of at least one GNSS satellite of a plurality of observable GNSS satellites using code minus carrier measurements from the at least one GNSS satellite; set at least one overbounded Vertical Ionosphere Gradient standard deviation ($\sigma_{vig}$) for the at least one GNSS satellite if the respective ionosphere quality metric meets a threshold; define one or more valid ionosphere regions where the at least one overbounded $\sigma_{vig}$ is applicable; determine which GNSS satellites of the plurality of observable GNSS satellites have an ionosphere pierce point within the one or more valid ionosphere regions where the at least one overbounded $\sigma_{vig}$ is applicable; and output the at least one overbounded $\sigma_{vig}$ and an indication of which GNSS satellites have an ionosphere pierce point within the one or more valid ionosphere regions.

Example 2 includes the GBAS of Example 1, wherein output the at least one overbounded $\sigma_{vig}$ and the indication of which GNSS satellites have an ionosphere pierce point within the one or more valid ionosphere regions comprises broadcasting the at least one overbounded $\sigma_{vig}$ and the indication of which GNSS satellites have an ionosphere pierce point within the one or more valid ionosphere regions with a broadcast module.

Example 3 includes the GBAS of any of Examples 1-2, wherein the processing module is further configured to compute and broadcast differential corrections for measurements from the GNSS satellites having an ionosphere pierce point within the one or more valid ionosphere regions.

Example 4 includes the GBAS of Example 3, wherein the plurality of observable GNSS satellites include satellites from multiple GNSS constellations.

Example 5 includes the GBAS of Example 4, wherein the differential corrections are broadcast for GNNS satellites from only one GNSS constellation.

Example 6 includes the GBAS of any of Examples 1-5, wherein the at least one processing module is further configured to output an indication of which GNSS satellites do not have an ionosphere pierce point within the one or more valid ionosphere regions, wherein the indication includes a notice that signals from GNSS satellites that do not have an ionosphere pierce point within the one or more valid ionosphere regions are not safe for mitigation using the overbounded $\sigma_{vig}$.

Example 7 includes the GBAS of any of Examples 1-6, wherein the respective ionosphere quality metric along a line of sight of at least one GNSS satellite corresponds to a rate of change of a total electron count along the line of sight of the at least one GNSS satellite of the plurality of observable GNSS satellites.

Example 8 includes a method of mitigating spatial decorrelation errors in a Ground Based Augmentation System (GBAS) caused by ionosphere gradients, the method comprising: determining a quality metric of the ionosphere along a line of sight of at least one GNSS satellite of a plurality of GNSS satellites using code minus carrier measurements from the at least one GNSS satellite; setting at least one overbounded Vertical Ionosphere Gradient standard deviation ($\sigma_{vig}$) for measurements from the at least one GNSS satellite when the quality metric of the ionosphere along the line of sight of the at least one GNSS satellite meets a threshold; defining one or more valid ionosphere regions at a given period in time where the at least one overbounded $\sigma_{vig}$ is applicable; determining which GNSS satellites of the plurality of GNSS satellites have an ionosphere pierce point in the one or more valid ionosphere regions where the at least one overbounded $\sigma_{vig}$ is applicable; outputting the at least one overbounded $\sigma_{vig}$ and a list of GNSS satellites having an ionosphere pierce point in the one or more valid ionosphere regions.

Example 9 includes the method of Example 8, wherein determining a quality metric of the ionosphere includes determining the rate of change of the total electron count along the line of sight of the at least GNSS satellite of the plurality of GNSS satellites.

Example 10 includes the method of any of Examples 8-9, wherein defining the one or more valid ionosphere regions at a given period in time where the overbounded $\sigma_{vig}$ is applicable includes comparing the quality metrics of the ionosphere along multiple lines of sight for a plurality of GNSS satellites that are within a threshold distance of one another and determining whether the difference between the quality metrics is below a threshold.

Example 11 includes the method of any of Examples 8-10, further comprising determining whether the number of GNSS satellites having ionosphere pierce points in the one or more valid ionosphere regions will be able to produce a Vertical Protection Limit (VPL) that would meet a Vertical Alert Limit (VAL) required for a desired precision approach.

Example 12 includes the method of Example 11, further comprising waiting a timeout period before resuming operation when the number of GNSS satellites having ionosphere pierce points in the one or more valid ionosphere regions would not be able to produce the VPL that would be able to meet the VAL required for the desired precision approach.

Example 13 includes the method of any of Examples 8-12, further comprising outputting a list of GNSS satellites that have an ionosphere pierce point outside the one or more valid ionosphere regions.

Example 14 includes the method of Example 13, further comprising marking the GNSS satellites having an ionosphere pierce point in the one or more valid ionosphere regions as safe for mitigation using the overbounded $\sigma_{vig}$; and marking the GNSS satellites that have an ionosphere pierce point outside the one or more valid ionosphere regions as unsafe for mitigation using the overbounded $\sigma_{vig}$.

Example 15 includes a Ground-Based Augmentation System (GBAS) comprising: a plurality of Global Navigation Satellite System (GNSS) reference receivers configured to receive and process GNSS satellite measurements; at least one processing module communicatively coupled to the plurality of GNSS reference receivers, wherein the at least one processing module is configured to: determine a respective ionosphere quality metric along lines of sight for each of a plurality of observable GNSS satellites using code minus carrier measurements from the plurality of observable GNSS satellites; define one or more valid ionosphere regions where at least one respective ionosphere quality metric meets a threshold; determine which GNSS satellites of the plurality of observable GNSS satellites have an ionosphere pierce point within the one or more valid ionosphere regions; and output at least one overbounded Vertical Ionosphere Gradient standard deviation ($\sigma_{vig}$) corresponding to the one or more valid ionosphere regions and an indication of which observable GNSS satellites have an ionosphere pierce point within the one or more valid ionosphere regions.

Example 16 includes the GBAS of Example 15, wherein the satellite measurements for each of the plurality of observable GNSS satellites having an ionosphere pierce point within the one or more valid ionosphere regions are integrity-protected using the at least one overbounded $\sigma_{vig}$.

Example 17 includes the GBAS of any of Examples 15-16, wherein the plurality of observable GNSS satellites are from multiple GNSS constellations.

Example 18 includes the GBAS of Example 17, wherein the indication of which observable GNSS satellites have an ionosphere pierce point within the one or more valid ionosphere regions only includes satellites from a single GNSS constellation.

Example 19 includes the GBAS of Example 18, wherein the single GNSS constellation is the Global Positioning System (GPS).

Example 20 includes the GBAS of any of Examples 15-19, wherein the $\sigma_{vig}$ is overbounded by increasing the error bounding distance using at least one of: a K factor; and a sigma multiplier.

What is claimed is:

1. A Ground Based Augmentation System (GBAS), comprising:
    a plurality of Global Navigation Satellite System (GNSS) reference receivers configured to receive and process GNSS satellite signals;
    at least one processing module communicatively coupled to the plurality of GNSS reference receivers, wherein the at least one processing module is configured to:
        determine at least one respective ionosphere quality metric along a line of sight between at least one GNSS reference receiver and at least one GNSS satellite of a plurality of observable GNSS satellites using code minus carrier measurements from the at least one GNSS satellite;

set at least one overbounded Vertical Ionosphere Gradient standard deviation ($\sigma_{vig}$) for the at least one GNSS satellite if the respective ionosphere quality metric meets a threshold of ionosphere health;

define one or more valid ionosphere regions where the at least one overbounded $\sigma_{vig}$ is applicable based on an ionosphere pierce point of the at least one GNSS satellite along the line of sight and the at least one respective ionosphere quality metric;

determine which additional GNSS satellites of the plurality of observable GNSS satellites have an ionosphere pierce point within the one or more valid ionosphere regions where the at least one overbounded $\sigma_{vig}$ is applicable, wherein the additional GNSS satellites have not been used to define the one or more valid ionosphere regions; and output the at least one overbounded $\sigma_{vig}$ and an indication of which GNSS satellites have an ionosphere pierce point within the one or more valid ionosphere regions.

2. The GBAS of claim 1, wherein the at least one processing module is configured to output the at least one overbounded $\sigma_{vig}$ and the indication of which GNSS satellites have an ionosphere pierce point within the one or more valid ionosphere regions by broadcasting the at least one overbounded $\sigma_{vig}$ and the indication of which GNSS satellites have an ionosphere pierce point within the one or more valid ionosphere regions with a broadcast module.

3. The GBAS of claim 1, wherein the processing module is further configured to compute and broadcast differential corrections for measurements from the GNSS satellites having an ionosphere pierce point within the one or more valid ionosphere regions.

4. The GBAS of claim 3, wherein the plurality of observable GNSS satellites include satellites from multiple GNSS constellations.

5. The GBAS of claim 4, wherein the differential corrections are broadcast for GNNS satellites from only one GNSS constellation.

6. The GBAS of claim 1, wherein the at least one processing module is further configured to output an indication of which GNSS satellites do not have an ionosphere pierce point within the one or more valid ionosphere regions, wherein the indication includes a notice that signals from GNSS satellites that do not have an ionosphere pierce point within the one or more valid ionosphere regions are not safe for mitigation using the overbounded $\sigma_{vig}$.

7. The GBAS of claim 1, wherein the respective ionosphere quality metric along a line of sight of at least one GNSS satellite corresponds to a rate of change of a total electron count along the line of sight of the at least one GNSS satellite of the plurality of observable GNSS satellites.

8. A method of mitigating spatial decorrelation errors in a Ground Based Augmentation System (GBAS) caused by ionosphere gradients, the method comprising:

determining at least one respective quality metric of the ionosphere along a line of sight between at least one Global Navigation Satellite System (GNSS) receiver of a plurality of GNSS receivers and at least one GNSS satellite of a plurality of GNSS satellites using code minus carrier measurements from the at least one GNSS satellite;

setting at least one overbounded Vertical Ionosphere Gradient standard deviation ($\sigma_{vig}$) for measurements from the at least one GNSS satellite when the quality metric of the ionosphere along the line of sight of the at least one GNSS satellite meets a threshold of ionosphere health;

defining one or more valid ionosphere regions at a given period in time where the at least one overbounded $\sigma_{vig}$ is applicable based on an ionosphere pierce point of the at least one GNSS satellite along the line of sight and the at least one respective quality metric of the ionosphere;

determining which additional GNSS satellites of the plurality of GNSS satellites have an ionosphere pierce point in the one or more valid ionosphere regions where the at least one overbounded $\sigma_{vig}$ is applicable, wherein the additional GNSS satellites have not been used to define the one or more valid ionosphere regions;

outputting the at least one overbounded $\sigma_{vig}$ and a list of GNSS satellites having an ionosphere pierce point in the one or more valid ionosphere regions.

9. The method of claim 8, wherein determining a quality metric of the ionosphere includes determining the rate of change of the total electron count along the line of sight of the at least GNSS satellite of the plurality of GNSS satellites.

10. The method of claim 8, wherein defining the one or more valid ionosphere regions at a given period in time where the overbounded $\sigma_{vig}$ is applicable includes comparing the quality metrics of the ionosphere along multiple lines of sight for a plurality of GNSS satellites that are within a threshold distance of one another and determining whether the difference between the quality metrics is below a threshold.

11. The method of claim 8, further comprising determining whether the number of GNSS satellites having ionosphere pierce points in the one or more valid ionosphere regions will be able to produce a Vertical Protection Limit (VPL) that would meet a Vertical Alert Limit (VAL) required for a desired precision approach.

12. The method of claim 11, further comprising waiting a timeout period before resuming operation when the number of GNSS satellites having ionosphere pierce points in the one or more valid ionosphere regions would not be able to produce the VPL that would be able to meet the VAL required for the desired precision approach.

13. The method of claim 8, further comprising outputting a list of GNSS satellites that have an ionosphere pierce point outside the one or more valid ionosphere regions.

14. The method of claim 13, further comprising marking the GNSS satellites having an ionosphere pierce point in the one or more valid ionosphere regions as safe for mitigation using the overbounded $\sigma_{vig}$; and marking the GNSS satellites that have an ionosphere pierce point outside the one or more valid ionosphere regions as unsafe for mitigation using the overbounded $\sigma_{vig}$.

15. A Ground-Based Augmentation System (GBAS) comprising:

a plurality of Global Navigation Satellite System (GNSS) reference receivers configured to receive and process GNSS satellite measurements;

at least one processing module communicatively coupled to the plurality of GNSS reference receivers, wherein the at least one processing module is configured to:
determine a respective ionosphere quality metric along lines of sight between a plurality of GNSS reference receivers and each of a plurality of observable GNSS satellites using code minus carrier measurements from the plurality of observable GNSS satellites;

define one or more valid ionosphere regions where at least one respective ionosphere quality metric meets a threshold of ionosphere health, wherein the one or more valid ionosphere regions are defined based on an ionosphere pierce point of at least one GNSS satellite along a line of sight and the at least one respective ionosphere quality metric;

determine which additional GNSS satellites of the plurality of observable GNSS satellites have an ionosphere pierce point within the one or more valid ionosphere regions, wherein the additional GNSS satellites have not been used to define the one or more valid ionosphere regions; and output at least one overbounded Vertical Ionosphere Gradient standard deviation ($\sigma_{vig}$) corresponding to the one or more valid ionosphere regions and an indication of which observable GNSS satellites have an ionosphere pierce point within the one or more valid ionosphere regions.

16. The GBAS of claim 15, wherein the satellite measurements for each of the plurality of observable GNSS satellites having an ionosphere pierce point within the one or more valid ionosphere regions are integrity-protected using the at least one overbounded $\sigma_{vig}$.

17. The GBAS of claim 15, wherein the plurality of observable GNSS satellites are from multiple GNSS constellations.

18. The GBAS of claim 17, wherein the indication of which observable GNSS satellites have an ionosphere pierce point within the one or more valid ionosphere regions only includes satellites from a single GNSS constellation.

19. The GBAS of claim 18, wherein the single GNSS constellation is the Global Positioning System (GPS).

20. The GBAS of claim 15, wherein the $\sigma_{vig}$ is overbounded by increasing the error bounding distance using at least one of:

a K factor; and a sigma multiplier.

* * * * *